United States Patent

[11] 3,572,464

[72] Inventor Howard R. MacDonald
San Diego, Calif.
[21] Appl. No. 863,915
[22] Filed Oct. 6, 1969
[45] Patented Mar. 30, 1971
[73] Assignee Rohr Corporation
Chula Vista, Calif.

[54] METHOD AND APPARATUS FOR SUPPRESSING THE NOISE OF A FAN-JET ENGINE
4 Claims, 4 Drawing Figs.
[52] U.S. Cl. .................................................. 181/51,
239/127.3, 239/265.17, 239/265.13
[51] Int. Cl. ...................................................... B64d 33/06,
F01n 1/08, F01n 1/14
[50] Field of Search .......................................... 181/33, 43,
51, 35, 33.22, 33.221, 33.222; 239/127.3, 265.11,
265.13, 265.17

[56] References Cited
UNITED STATES PATENTS
2,934,889  5/1960  Poulos ........................ 181/33(.221)
2,696,709  12/1954  Oulianoff ..................... 181/33(.222)
3,017,747  1/1962  Steele ......................... 181/33(.221)
3,092,205  6/1963  Brown et al. ................. 181/33(.221)
FOREIGN PATENTS
838,617  6/1960  Great Britain ................ 239/265(.11)

Primary Examiner—Robert S. Ward, Jr.
Attorney—George E. Pearson

ABSTRACT: Both fan air and exhaust gas of a fan-jet engine are discharged through the lobes of a corrugated thrust nozzle and thus enter the atmosphere in streams spaced apart circumferentially of the aft end of said nozzle. Ambient air flows between the lobes of the nozzle and between said streams of combined fan air and exhaust gas. To provide wound suppression, a plurality of elongate vanes are positioned at the interfaces between the aforesaid streams, creating flow turbulence which promotes rapid mixing of ambient air with the fan air and exhaust gas.

Patented March 30, 1971
3,572,464
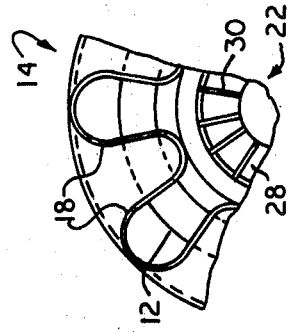
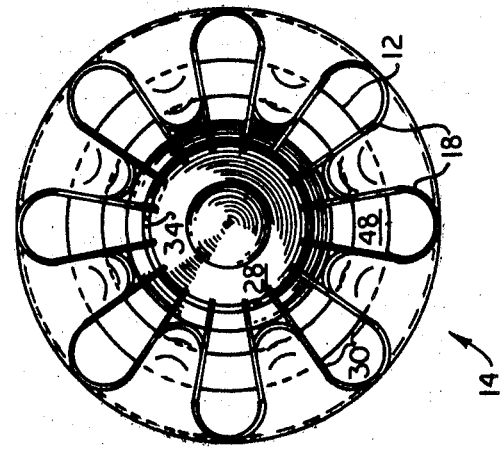
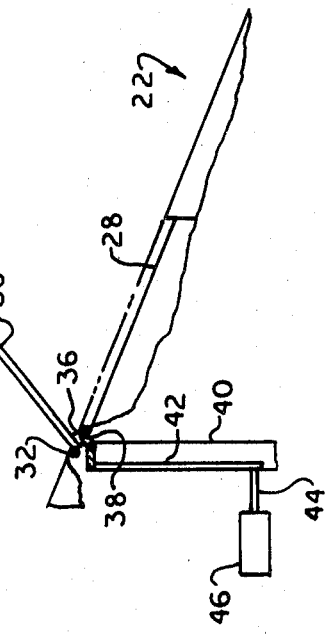
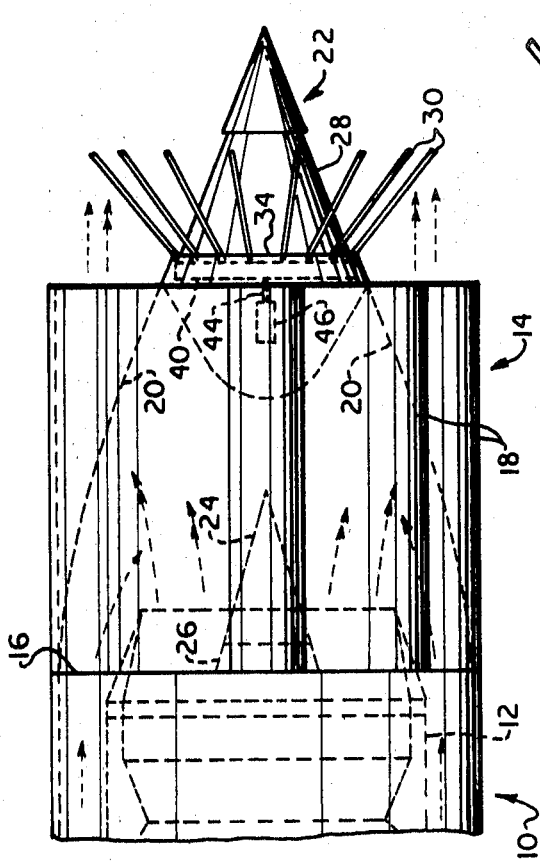
INVENTOR.
HOWARD R. MACDONALD
BY
Edwin D. Grant
ATTORNEY

METHOD AND APPARATUS FOR SUPPRESSING THE NOISE OF A FAN-JET ENGINE

SUMMARY OF THE INVENTION

This invention relates to jet-propelled aircraft and more particularly to a method and apparatus for reducing the noise created by aircraft having engines of the fan-jet type.

Part of the noise associated with the operation of jet-propelled aircraft results from the flow through the atmosphere of the high velocity exhaust gas discharged from the engine, or engines, of such aircraft. The amount of sound energy so generated by streams of exhaust gas depends upon the temperature and velocity thereof. The present invention provides for the rapid mixing of the high velocity, high temperature exhaust stream of a fan-jet engine with atmospheric air both inside a housing which encloses said engine and at the exit of a thrust nozzle mounted on the aft end of said housing, the air mixed with the exhaust gas inside the housing being fan air of the engine and the air mixed with the exhaust gas at the nozzle exit being slipstream air which flows past the housing. The combined jet stream of air and exhaust gas has a lower velocity than that of the exhaust gas when the latter is discharged as a separate stream, as well as a lower temperature. Thus the invention suppresses the noise generated by the discharge of the exhaust gas to the atmosphere.

More particularly, in a preferred embodiment of the invention a tubular housing is disposed in concentric, spaced relation around the turbine casing of a fan-jet engine, the aft ends of said housing and said casing being substantially coterminous and fan air of said engine being discharged through the gap between said housing and casing. A corrugated, or lobed, thrust nozzle is mounted on the aft end of the housing and extends rearwardly therefrom in coaxial relation with said housing and casing. The corrugations which form the lobes of the nozzle extend axially of the latter and gradually increase in depth in the downstream direction so that the forward edge of the nozzle is circular to match the aft edge of the housing and the aft edge thereof is convoluted, with the inner portions of the convoluted aft edge of the nozzle being attached to a tear-shaped plug. A conical plug is also coaxially disposed in the forward portion of the throat of the nozzle and secured at its base to the aft end of the engine. Exhaust gas of the engine is discharged from the engine casing into the annular space bounded by the forward portion of the nozzle wall and the surface of the conical plug, and as the exhaust gas travels rearwardly through the nozzle it mixes with fan air discharged into said nozzle from the gap between the housing and the engine turbine casing, the intermixed exhaust gas and fan air flowing through the passages bounded by the surface of the tear-shaped plug and the inner surfaces of the nozzle lobes. Hence exhaust gas and fan air are discharged to the surrounding atmosphere in streams spaced apart circumferentially of the aft end of the nozzle, and ambient air flows along the outer surface of the housing, through the valleys between the lobes of the nozzle, and then between the streams of combined exhaust gas and ambient air. The plug at the aft end of the nozzle carries a plurality of elongate vanes which are movable between a retracted position wherein they are adjacent the surface of said plug and a deployed position wherein they extend outwardly from said surface and are respectively aligned with the radially extending wall portions of the lobes of the nozzle. Thus in the deployed position the vanes create turbulence in the flow of the aforesaid streams at the interfaces thereof, which increases the rate of mixing of fan air and ambient air with exhaust gas of the fan-jet engine and suppresses the sound generated by discharge of said exhaust gas to the atmosphere.

DESCRIPTION OF THE DRAWINGS

FIG. 1 is a side elevation of a preferred embodiment of this invention the drawing illustrating in solid lines the rear portion of a housing which envelops a fan-jet engine, a thrust nozzle attached to the aft end of said engine, a plug mounted at the aft end of said nozzle, and a plurality of vanes carried by said plug, said vanes being shown in the deployed position thereof;

FIG. 2 is a rear view of the same embodiment;

FIG. 3 is a fragmentary, detail view of the aforesaid plug and a typical one of the vanes mounted thereon, together with components associated with the vanes for moving them between their deployed and retracted positions; and FIG. 4 is a fragmentary rear view of the same embodiment, illustrating the retracted position of the vanes.

DETAILED DESCRIPTION

As illustrated in FIG. 1, a preferred embodiment 28 the 41 invention comprises a tubular housing, or nacelle which is generally designated by the number 26 and which is disposed in concentric, spaced relation around the turbine casing 12 is of a fan-jet engine. The space between housing 10 and casing 12 is connected with the fan section of the engine by means of ducts (not shown) so that it serves as a passage for the flow of fan air (represented by single-headed arrows in the drawing) to a thrust nozzle which is generally designated 14 and which is attached to the aft edge 16 of housing 10, sail housing aft edge being substantially coterminous with the aft edge of casing 12. At its forward end nozzle 14 is circular in cross section so that it matches the aft end of the housing, but the wall of the nozzle is formed with a plurality of longitudinally extending, circumferentially spaced corrugations which begin at a point near the forward end of the nozzle and extend to the aft end thereof, thus forming a plurality of longitudinally extending, radially projecting lobes 18 on said nozzle. The valleys between the lobes gradually increase in depth in the downstream direction, and the innermost portions 20 of the nozzle wall converge toward and are fixedly secured to a generally tear-shaped, hollow plug, generally designated 22, which is coaxial with the nozzle. In the illustrated embodiment the crests of lobes 18 are the same distance from the longitudinal axis of the nozzle along the entire length of the nozzle. However, in other embodiments of the invention the crests of the lobes may either diverge from, or converge toward, the longitudinal axis of the nozzle. The illustrated embodiment also comprises a conical plug 24 which is mounted on the aft end bearing housing 26 of the fan-jet engine and which may be omitted in some forms of the invention.

Extending around plug 22 is a shallow recess 28. The ends of a plurality of elongate vanes 30 are pivoted by means of pins 32 (one of which is illustrated in FIG. 3) to the forward shoulder 34 of this recess, said vanes being spaced apart around the plug so that they are aligned with the radially extending wall portions of the lobes 18 of nozzle 14 (see FIG. 2). The axes of pins 32 are disposed tangential to the surface of plug 22 so that the vanes can be moved between a retracted position (represented by a broken line in FIG. 3 and also illustrated in FIG. 4) wherein they extend axially of said plug in adjacency with the surface of recess 28, and a deployed position (illustrated in FIGS. 1—3) wherein they extend outwardly from the plug. An arm 36 extends laterally from each vane at the pivoted end thereof, and a link 38 is pivoted at one end to the free end of each arm and at its other end to a ring 40 which is coaxially disposed within plug 22 and which is rigidly connected by means of struts 42 to the drive shaft 44 of an actuator 46, said actuator being fixedly supported within said plug by suitable means.

OPERATION

At the forward end of nozzle 14 fan air which flows through the space between housing 10 and casing 12 mixes with exhaust gas (represented by double-headed arrows in FIG. 1) discharged from casing 12, and the mixture of fan air and exhaust gas is discharged to the atmosphere through passages 48 bounded by the outer surface of plug 22 and the inner surfaces of lobes 18 of the nozzle. A portion of the slipstream around housing 10 flows inwardly through the spaces between lobes 18 and thence between the streams of combined fan air and exhaust gas issuing from said lobes. Thus even when vanes 30 are in the retracted position illustrated in FIG. 4 there is mixing of exhaust gas with cooler, relatively lower velocity air, the latter consisting of both fan air and slipstream air. This mixing reduces the noise generated by the exhaust gas as it flows through the atmosphere, as explained hereinbefore. However, to achieve maximum sound suppression, actuator 46 is operated to move ring 40 rearwardly, which causes links 38 to swing vanes 30 outwardly to the deployed position illustrated in FIGS. 1—3. The vanes are then located at the interfaces between the streams of slipstream (or ambient) air and the streams of combined exhaust gas and fan air, and the impingement of these streams upon the vanes creates zones of flow turbulence in the exhaust plume of the propulsion plant, which zones extend radially from the center of the plume to its expansion boundary and are spaced apart circumferentially thereof. This flow turbulence increases the rate of mixing of air with the exhaust gas and further reduces the noise generated by the propulsion plant.

It will be recognized that various changes and modifications could be made in the described and illustrated apparatus without departing from the concept of the invention. Hence the scope of the invention should be considered to be limited only by the terms of the claims appended hereto.

I claim:

1. In a jet propulsion plant having a fan-jet engine, the combination comprising:

a tubular housing spaced around the aft portion of the casing of said engine, exhaust gas and fan air of said engine being discharged from said casing and from the space between the later and said housing, respectively;

a thrust nozzle mounted on the aft end of said housing and extending downstream from the aft end of said casing, lobes being formed on said nozzle so that said exhaust gas and fan air are discharged together to the surrounding atmosphere in streams spaced apart circumferentially of the aft end of said nozzle and so that streams of ambient air flow between said lobes and thence between said streams of combined exhaust gas and fan air issuing from the latter;

a plug centrally disposed within the aft end of said nozzle and projecting downstream therefrom, the periphery of said plug being attached to the inner portions of said lobes;

a plurality of elongate vanes mounted on said plug for movement into and out of said streams, said vanes being aligned with the radially extending wall portions of said lobes when they are moved into said streams, thus creating flow turbulence at the interfaces of the latter; and means operatively associated with said jet propulsion plant for moving said vanes into and out of said streams.

2. The combination defined in claim 1 wherein one end of each of said vanes is pivoted to said plug, whereby said vanes are movable between a retracted position wherein they extend axially of said plug in adjacency with the outer surface thereof and a deployed position wherein they extend outwardly from said outer surface.

3. A method of suppressing the noise of operation of an aircraft having a jet propulsion plant with a fan-jet engine, which comprises:

discharging from a corrugated thrust nozzle a plurality of streams which consist of both exhaust gas and fan air of said engine and which are spaced apart circumferentially of the aft end of said nozzle;

permitting streams of ambient air to flow between said streams of combined exhaust gas and fan air; and creating flow turbulence at the interfaces between said streams.

4. The method defined in claim 3 wherein said flow turbulence is created by disposing a plurality of elongate vanes in said streams at the interfaces thereof.